(12) United States Patent
Kumar et al.

(10) Patent No.: US 11,739,252 B2
(45) Date of Patent: Aug. 29, 2023

(54) MICROBECIDAL COMPOSITION AND A METHOD FOR MITIGATING INTERNAL MICROBIOLOGICAL INFLUENCED CORROSION IN PETROLEUM TRANSPORTING PIPELINES

(71) Applicant: Indian Oil Corporation Limited, Mumbai (IN)

(72) Inventors: Manoj Kumar, Haryana (IN); Qazi Mohammad Amir, Haryana (IN); Prakash Chandra Sahoo, Haryana (IN); Suresh Kumar Puri, Haryana (IN); Sankara Sri Venkata Ramakumar, Haryana (IN)

(73) Assignee: Indian Oil Corporation Limited, Mumbai (IN)

( * ) Notice: Subject to any disclaimer, the term of this patent is extended or adjusted under 35 U.S.C. 154(b) by 142 days.

(21) Appl. No.: 17/199,226

(22) Filed: Mar. 11, 2021

(65) Prior Publication Data
US 2021/0284894 A1 Sep. 16, 2021

(30) Foreign Application Priority Data

Mar. 11, 2020 (IN) .............................. 202021010344

(51) Int. Cl.
| | | |
|---|---|---|
| *E21B 41/02* | (2006.01) | |
| *C09K 8/54* | (2006.01) | |
| *A01N 25/12* | (2006.01) | |
| *A01N 35/02* | (2006.01) | |
| *A01N 33/12* | (2006.01) | |
| *A01N 43/80* | (2006.01) | |
| *A01N 57/20* | (2006.01) | |

(52) U.S. Cl.
CPC ............... *C09K 8/54* (2013.01); *A01N 25/12* (2013.01); *A01N 33/12* (2013.01); *A01N 35/02* (2013.01); *A01N 43/80* (2013.01); *A01N 57/20* (2013.01); *E21B 41/02* (2013.01)

(58) Field of Classification Search
CPC .................................. C09K 8/54; E21B 41/02
USPC .................................................. 166/250.01
See application file for complete search history.

(56) References Cited

U.S. PATENT DOCUMENTS

| | | | |
|---|---|---|---|
| 9,732,369 B2 | 8/2017 | Pilloni et al. | |
| 10,085,445 B2 * | 10/2018 | Fuji | ............................ A61L 2/16 |
| 10,604,710 B2 * | 3/2020 | Moloney | ................. C23F 11/10 |
| 2015/0217323 A1 | 8/2015 | Broze et al. | |
| 2016/0360749 A1 * | 12/2016 | He | .......................... B08B 17/00 |
| 2018/0207693 A1 | 7/2018 | Long | |
| 2019/0023975 A1 | 1/2019 | Shim et al. | |
| 2019/0055484 A1 * | 2/2019 | Bartels | .................... C10G 75/02 |

FOREIGN PATENT DOCUMENTS

| | | |
|---|---|---|
| CN | 108779557 A | 11/2018 |
| WO | WO-2019/014061 A1 | 1/2019 |
| WO | WO-2019/050909 A1 | 3/2019 |
| WO | WO-2019/094615 A1 | 5/2019 |

OTHER PUBLICATIONS

S. Subhashini, "Eco Friendly Chitosan Schiff Bases for Enhanced Corrosion Resistance of Mild Steel in Acid Medium and Calcium Carbonate Scale Inhibition", http://hdl.handle.net/18603/199173, Apr. 20, 2017, 2 pgs.
D. Watkins, et al., "Extraction and Characterization of Lignin from Different Biomass Resources", Journal of Materials Research and Technology, www.sciencedirect.com; 2015; vol. 4, No. 1, pp. 26-32.
C. Frangville, et al., "Fabrication of Environmentally Biodegradable Lignin Nanoparticles", ChemPhysChem, 2012, vol. 13, pp. 4235-4243.

* cited by examiner

*Primary Examiner* — William D Hutton, Jr.
*Assistant Examiner* — Ashish K Varma
(74) *Attorney, Agent, or Firm* — Blank Rome LLP

(57) ABSTRACT

The present invention provides a composition and a method for mitigating formation or activity of a corrosion-associated biofilm on metal surfaces of pipelines. The pipelines are first treated with pigs i.e. bi-di pigs for removing/disturbing biofilm, followed by microbial treatment i.e. application of microbecidal composition. The microbecidal composition comprising at least one alcohol, one corrosion inhibitor, one surfactant, one biocide and a lignin-based nanoparticle. The lignin-based nano particle is functionalized with amine functionalizing agent. The present composition and method is eco-friendly, as low concentration is sufficient and further, regular dosing is not required for MIC control.

8 Claims, No Drawings

MICROBECIDAL COMPOSITION AND A METHOD FOR MITIGATING INTERNAL MICROBIOLOGICAL INFLUENCED CORROSION IN PETROLEUM TRANSPORTING PIPELINES

RELATED APPLICATION

This application claims the benefit of Indian Application No. 202021010344, filed on Mar. 11, 2020. The entire disclosure of this application is hereby incorporated by reference.

FIELD OF THE INVENTION

The present invention relates to a liquid composition comprising microbecides or a functionally equivalent analog or derivative thereof and a method for reducing or preventing the formation or activity of a corrosion-associated biofilm on a metal surface. More particularly, the present invention provides a microbecidal composition for mitigating the internal microbiological influenced corrosion in petroleum transporting pipelines and a method thereof.

BACKGROUND OF THE INVENTION

Microbiologically influenced corrosion (MIC) is defined as a damage to engineered materials and processing systems that is mediated by living organisms. Oil production and distribution systems are particularly vulnerable for microbiologically influenced corrosion (MIC) activities and can lead to corrosion in metallic assets and associated losses.

The main classes of microbes associated with biofouling are sulfate-reducing bacteria (SRB), iron-oxidizing/reducing bacteria (IRB), bacteria secreting organic acids (APB), exopolymers or slime (SPB), methanogen, nitrate reducing bacteria and low nutrient bacteria etc. These organisms in most of the cases coexists in naturally occurring biofilms, often forming synergistic communities that are able to affect electrochemical processes through co-operative metabolism, not seen in the individual. Corrosion caused by bacteria results in pitting on metal surface and results in extensive damage to oil and gas storage, production, and transportation equipment. Pipe systems, tank bottoms, and other pieces of oil production equipment can rapidly fail if there are areas where microbial corrosion is occurring. If a failure occurs in a pipeline or oil storage tank bottom, the released oil can have serious environmental consequences.

A variety of strategies have been developed to mitigate MIC, including, the use of corrosion-resistant metals, temperature control, pH control, radiation, filtration, protective coatings with corrosion inhibitors or other chemical controls i.e., biocides, bacteriological controls i.e., phages, competitive microflora, pigging (i.e., mechanical removal of muck and corrosion products, anodic and cathodic protection, and modulation of nutrient levels etc. However, these methods are generally high cost, have short lifespan, lack effectiveness, and also requires repeated application.

Combination of pigging and biocide are the most commonly used approaches for controlling the MIC in oil transporting pipelines. Pigging removes the muck and biofilm on the pipe surfaces, however several times biocide treatment is less effective due to their poor permeability. Biocides often requires frequent dosing or continuous dosing. Further, commonly used biocides are dosed at high concentration which are environmentally reactive. The solubility of biocide to oil phase is also an issue.

Thus, there is a need for a composition and a method for reducing and/or mitigating the MIC in the pipelines which solves the above-indicated problems associated with existing methods.

WO 2019/014061 discloses compositions and methods for controlling souring and corrosion causing prokaryotes, such as SRP, by treating oil and gas field environments or treatment fluids with a newly identified bacterial strain PTA-124262 as a self-propagating whole cell that produces an anti-SRP bacteriocin in-situ. In another aspect, the methods use one or more toxic peptides or proteins isolated therefrom in methods to control unwanted prokaryotic growth in these environments.

US 2019/0023975 relates to biocide compositions, formulations and methods for using formulations. U.S. Pat. No. 9,732,369 provides a multi-phase process for conditionally treating MIC by evaluating whether MIC-correlating conditions exist, the degree of MIC, if present, and then applying a concomitant MIC-mitigating treatment which is adjusted in its degree of aggressiveness in proportion to MIC severity. The disclosed methodology allows, in part, for the continuous or periodic monitoring and assessment of MIC risk in petroleum-based equipment (e.g., pipeline) and the administering of a treatment that corresponds to the level of severity of the MIC resulting in a more fine-tuned, localized, and cost-effective treatment.

U.S. Ser. No. 10/085,445 provides an agent for inhibiting biocorrosion of a metal, which shows high environmental and occupational safety. US20160360749 describes methods for mitigating or eliminating MIC of a metal surface including contacting the metal surface with an effective amount of a liquid composition comprising indole or a functionally equivalent analog or derivative thereof. Also provided are methods for reducing the formation or activity of a corrosion-associated biofilm on a metal surface including contacting the metal surface with an effective amount of a liquid composition including indole or a functionally equivalent analog or derivative thereof.

WO2019050909A1 relates to a method of corrosion inhibition on a metal surface. A corrosion inhibitor can be sulfonate corrosion inhibitor, dissolved in a solvent where solvent can be an alcohol or water; composition may also include components like biocides and others. The document also discloses the batch application of composition between two pigs or scrapers.

US20150217323A1 describes a pipeline pig for wetting the top inner surface of a pipeline comprising a pig body, one or more circular brushes attached to the pig body, and means for rotating the one or more circular brushes as the pig moves through the pipeline. The document also discloses method for holding the corrosion inhibitor between the front and rear disc of the pig, allowing for bath corrosion inhibitor treatment.

US20180207693A1 discloses a system comprising pipe pig, comprising a first mounting hub coupled to a mandrel and a first sealing element. The pipe pig further comprises two chassis, each of which is coupled to the mounting hub and the sealing element. Further, discloses a Bi-directional Pig which is a displacement type utility pig, useful for batching qualities and it can run in either direction within the pipeline.

CN108779557A relates to a corrosion inhibiting composition comprising of salt of a fatty acid-amine condensate and an aromatic solvent. Composition is useful in inhibiting/preventing corrosion of metal surface used in recovery, transportation, refining or storage of a hydrocarbon fluid containing elemental sulfur or polysulfide.

WO2019094615A1 relates to biocide composition comprising biocide, antimicrobial oil, antimicrobial component from natural or essential oil, at least on surfactant and a solubilizing agent.

The document Menaka et. al discloses antioxidant properties of lignin and its broader application as anti-microbial, anti-aging agent and corrosion inhibitor. Further, the document also describes the inhibitive properties of modified lignin and it's use as a corrosion inhibitor in steel.

Camille Frangville et. al discloses a method for fabrication of lignin nanoparticles which are nontoxic. The method for fabrication of lignin nanoparticles described as 1 wt. % lignin dissolved in ethylene glycol, lignin particle size as a function of aqueous HCl concentration after mixing a 90% vol lignin solution in ethylene glycol with 10% vol aqueous HCl. The lignin particle size increased from less than a hundred nanometres at very low acid concentrations to nearly 2 mm for 2.6 m HCL.

Though, several compositions and methods are available in the art, however these compositions and methods suffer disadvantages such as requirement of higher biocide concentration/dosing, continuous dosing of biocide, microbial resistance to biocides and discarding of crude and biocide mixture during MIC mitigation process in pipeline. Thus, there is an urgent need to develop an effective, environment friendly and cost-effective biocide composition which does not require regular biocide dosing. Further, to develop an effective method to mitigate the problem of microbiologically influenced corrosion (MIC) in pipelines.

SUMMARY OF THE INVENTION

In an aspect of the present invention, there is provided a microbecidal composition for mitigating internal microbiological influenced corrosion (MIC) in petroleum transporting pipelines, the composition comprising of:
  (i) a lignin-based nanoparticle in an amount ranging from 2000-20,000 ppm;
  (ii) a biocide in an amount ranging from 500-5000 ppm;
  (iii) a surfactant in an amount ranging from 100-1000 ppm;
  (iv) a corrosion inhibitor in an amount ranging from 50-500 ppm; and
  (v) at least one alcohol.

In an embodiment of the present invention, there is provided a microbecidal composition, wherein the lignin-based nanoparticle is functionalized with amine functionalizing agent.

In another embodiment of the present invention, there is provided a microbecidal composition wherein the size of the lignin-based nanoparticle is in the range of 20-50 nm.

In still another embodiment of the present invention, there is provided a microbecidal composition wherein the biocide is selected from the group consisting of aldehydes, acrolein, quaternary ammonium compounds, amines, diamines, isothiazolones, methyl chloromethyl-isothiazolone and 4,5-dichloro-2-n-octyl-4-isothiazolin-3-one, Tetrakis(hydroxymethyl) phosphonium sulfate, Didecyldimethylammonium chloride, Didecyldimethylammonium carbonate and a combination thereof.

In yet another embodiment of the present invention, there is provided a microbecidal composition wherein the alcohol is selected from the group consisting of ethanol and isopropanol, a glycol, ethylene glycol, diethylene glycol, 1,2-propylene glycol, dipropylene glycol, tripropylene glycol, a glycol ether, butyl glycol and butyl diglycol, a glycol ester, butyl diglycol acetate, 2, 2, 4-trimethylpentanediol monoisobutyrate, polyethylene glycol, polypropylene glycol, benzyl alcohol, n-butyl alcohol, benzyl alcohol, 2, 4-dichlorobenzyl alcohol, 2-phenoxyethanol and a combination thereof.

In still another embodiment of the present invention, there is provided a microbecidal composition wherein the components (i)-(iv) of composition are dispersed in alcohol.

In an embodiment of the present invention, there is provided a microbecidal composition wherein the surfactant is selected from the group consisting of long chain alkylamine or N-based alkylamines and derivatives, N-[2-[(2-Aminoethyl) amino] ethyl]-9-octadecenamide, n-Benzalkonium chloride (BAC), $C_nH (2_{n-1})$-$COO(CH_2CH_2O)12CH_3$, polyoxyethylene alkyl ether, n-alkyl trimethyl ammonium surfactant, potassium alkanoate, Dodecylpyridinium bromide, octylglucoside, sodium dodecyl sulfate, trans-Cinnamaldehyde, sodium bis-(2-ethylhexyl)-sulfosuccinate, cetylpyridinium chloride, primary alcohol ethoxylate, polyoxyethylene nonyl phenyl ether, polyethylene glycol esters, linoleate, dodecyl amine and a combination thereof.

In another embodiment of the present invention, there is provided a microbecidal composition wherein the corrosion inhibitor is selected from the group consisting of N,N-dimethylethanolamines, (N,N-dimethylaminoethoxy) ethanol; dimethylethanolamine; triethanolamine; methyldiethanolamine; ethanolamine; diethanolamine; other cyclic amines including morpholine, methylmorpholine, ethylmorpholine, piperidine, alkylpiperidines, piperazine, alkylpiperazines; ethyleneamines including DETA, TETA, TEPA, and the like; alkylamines including methylamine, dimethylamine, alkylmethylamines, dimethylalkylamines; methylaminopropylamine; dimethylaminopropylamine; dimethylaminoethylamine; methylaminoethylamine, oleic acid and a combination thereof.

In another aspect of the present invention, there is provided a method for mitigating microbiologically induced corrosion (MIC) in transport pipelines, the method comprising of:
  i. venting and draining of launching barrel to remove traces of vapors, oil and reducing the pressure inside the barrel to zero;
  ii. introducing first Bi-Di pig along with transmitter in the barrel of step (i); and injecting first dose of microbecidal composition as claimed in claim 1;
  iii. injecting crude oil through kicker line in the barrel of step (ii) to push pig into the main pipeline and opening of barrel valve and kicker line valve;
  iv. closing of main line valve and injecting second dose of microbecidal composition into the barrel and further opening of barrel valve, kicker line valve and keeping main line valve in close condition;
  v. running booster pumps and injecting crude oil to push the composition into mainline for a duration of 10 minutes;
  vi. repeating steps (iii-v) and inserting second Bi-Di pig along with transmitter after venting and draining of launching barrel to obtain reduced microbial count in the pipeline; and
  vii. tracking with pig alert/tracker followed by opening of main line valve and closing of kicker line valve and barrel valve.

In an embodiment of the present invention, the MIC is caused by a bacterial biofilm deposited on the metal surface.

These and other features, aspects, and advantages of the present subject matter will be better understood with reference to the following description. This summary is provided to introduce a selection of concepts in a simplified form.

DESCRIPTION OF THE INVENTION

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

Definition

For the purposes of this invention, the following terms will have the meaning as specified therein:

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to" "including" and "including but not limited to" are used interchangeably.

Microbial Influenced Corrosion ("MIC") is frequently observed at oil production sites and in transport pipelines, among other types of equipment involved in the oil production industry. MIC poses severe operational, environmental, and safety problems to the petroleum and/or natural gas industries, particularly with respect to corrosion of equipment used in the storage, processing, and/or transport of oil and gas crude and/or processed materials. Costs resulting from MIC in these industries due to repair and replacement of damaged equipment, spoiled oil, environmental clean-up, and injury-related health care, amount to well over several billions per year. Biofilms that form on the surfaces of such metal components are thought to be the primary causative agent triggering such corrosion as many biofilm forming environmental bacteria-particularly those in anaerobic environments-produce harmful gases (e.g., hydrogen sulfide), acids (e.g., sulfuric acid), and other agents which are highly corrosive, and which poses health and safety concerns to those workers in the industry.

As used herein, the term "microbecide" refers to any compound which can inhibit the growth of microorganisms.

As used herein, the term "Microbial Influenced Corrosion" or "MIC" or similar terms are terms in the art and shall be understood according to the meaning described in the field, i.e., corrosion to metal surfaces caused directly or indirectly through the effects of bacteria and their by-products and metabolites at metal surfaces, including especially bacteria that grow on the surface of metal in a biofilm. MIC can occur in both aerobic and anaerobic conditions and generally is thought to at least require the presence of bacteria in a biofilm. MIC is considered "biotic corrosion." MIC is also associated with surface pitting, which leads to more rapid corrosive failure than uniform corrosion.

As used herein, "corrosion" means the deterioration of a material as a result of chemical interactions between it and the surrounding environment. The chemical interactions may be caused by exposure to corrosive substances, such as acids, carbon dioxide, hydrogen sulfide, and brines of different salinities.

As used herein, the term "pigging" refers to the well-known process of intentional mechanical delamination of corrosion products and biofilm material from the surfaces of metals.

In accordance with the present invention, a microbecidal composition is provided for mitigating internal microbiological influenced corrosion in petroleum transporting pipelines. The composition comprising of one lignin-based nanoparticle, one biocide, one surfactant, one corrosion inhibitor and at least one alcohol.

In an embodiment, there is provided a microbecidal composition for mitigating internal microbiological influenced corrosion in petroleum transporting pipeline, the composition comprising of a lignin-based nanoparticle in an amount ranging from 2000-20,000 ppm; a biocide in an amount ranging from 500-5000 ppm; a surfactant in an amount ranging from 100-1000 ppm; a corrosion inhibitor in an amount ranging from 50-500 ppm and at least one alcohol.

The lignin described herein in the present invention, can be obtained from any plant including but not limited to rice husk, clover, corn cobs, wheat straw, jute, oat straw, barley straw, jute stick, eucalyptus, bagasse, eucalyptus, spruce wood, bamboo, peanut shells, spruce wood and coconut shells. In the present invention, the lignin has been commercially obtained.

In an embodiment, the lignin can be made nanosized. In an embodiment of the present invention, the size of the lignin-based nanoparticle is in the range of 20-50 nm.

In another embodiment of the present invention, the lignin-based nanoparticle is functionalized with amine functionalizing agent.

The present invention also provides a method of preparing an amine functionalized lignin-based nanoparticle. In the first step, the lignin is isolated from different biomass by any process described in prior art (Watkins et. al. "Extraction and characterization of lignin from different biomass resources. Journal of Materials Research and Technology 4, no. 1 (2015): 26-32). Subsequently, the lignin nanoparticle is being prepared by hydrochloric acidolysis followed by stabilization. Particularly, a solution of 5 wt. % of lignin in ethylene glycol is prepared and stirred for 2 hours at a temperature of 45° C., then hydrochloric acid (0.2 M) and $HNO_3$ (0.2 M) is separately added to lignin solutions at a rate of 5 drop/min until reaching the set pH values of 2. Further, 0.02 M Sodium bis-(2-ethylhexyl)-sulfosuccinate is added to the solution drop wise as stabilizer. The reaction is retained for another 2 hours and then filtered to remove the insoluble impurities from lignin. Finally, the solution is dialyzed against deionized water for 24 hours and a final pH of 7.0 is being obtained. To functionalize the lignin nano particle, 0.02 mM triethylene tetramine is added to the solution and stirred for 30 minutes at 50° C. Subsequently, 0.02 mM formaldehyde solution is added at a rate of 0.1 g/min to lignin-triethylene tetramine solutions. The amine functionalized lignin is obtained as pale-yellow color solution and the Transmission Electron Microscopy (TEM) analysis confirmed the particle size as 20-50 nm.

Accordingly, in an embodiment of the present invention, there is provided a method of preparing an amine functionalized lignin-based nanoparticle, the method comprising the steps of:

i. adding a solution of 5 wt. % of lignin to ethylene glycol and stirring at a temperature of 45° C. for a duration of 2 hours;
ii. adding 0.2M hydrochloric acid and 0.2M nitric acid to the solution of step (i) at a rate of 5 drop/minute until reaching at pH value of 2;
iii. adding drop wise 0.02 M Sodium bis-(2-ethylhexyl)-sulfosuccinate to the solution of step (ii) as stabilizer;
iv. keeping the solution for a duration of 2 hours and filtering to remove the insoluble impurities;
v. obtaining a lignin-based nanoparticle by dializing the solution of step (iv) against deionized water for a duration of 24 hours to reach at a final pH of 7; and
vi. adding 0.02 mM triethylene tetramine to the lignin-based nano particle and stirring the solution at a temperature of 50° C. for a duration of 30 minutes; adding 0.02 mM formaldehyde solution at a rate of 0.1 g/min to obtain amine functionalized lignin-based nanoparticle.

In another embodiment, the present invention provides a microbecidal composition wherein the alcohol used in the composition includes but are not limited to ethanol and isopropanol, glycol, ethylene glycol, diethylene glycol, 1, 2-propylene glycol, dipropylene glycol, tripropylene glycol, glycol ether, butyl glycol, butyl diglycol, glycol ester, butyl diglycol acetate, 2, 2, 4-trimethylpentanediol monoisobutyrate, polyethylene glycol, polypropylene glycol, benzyl alcohol, n-butyl alcohol, benzyl alcohol, 2, 4-dichlorobenzyl alcohol, 2-phenoxyethanol and combinations thereof.

In a preferred embodiment of the present invention, the alcohol is selected from ethanol and isopropanol. The alcohol in the microbecidal composition is the dispersing medium for dispersing the components of microbecidal composition.

In yet another embodiment, the surfactant used in the microbecidal composition includes but are not limited to long chain alkylamine or N-based alkylamines and derivatives, N-[2-[(2-Aminoethyl) amino] ethyl]-9-octadecenamide, n-Benzalkonium chloride (BAC), $C_nH_{(2n+1)}$-COO($CH_2CH_2O$)12$CH_3$, polyoxyethylene alkyl ether, n-alkyl trimethyl ammonium surfactant, potassium alkanoate, Dodecylpyridinium bromide, octylglucoside, sodium dodecyl sulfate, trans-Cinnamaldehyde, sodium bis-(2-ethylhexyl)-sulfosuccinate, cetylpyridinium chloride, primary alcohol ethoxylate, polyoxyethylene nonyl phenyl ether, polyethylene glycol esters, linoleate, dodecyl amine and combinations thereof.

In a preferred embodiment of the present invention, the surfactant is selected from long chain alkylamine and N-based alkylamines.

In an embodiment, the corrosion inhibitor used in the microbecidal composition includes but not limited to N,N-dimethylethanolamines, (N,N-dimethylaminoethoxy) ethanol; dimethylethanolamine; triethanolamine; methyldiethanolamine; ethanolamine; diethanolamine; other cyclic amines including morpholine, methylmorpholine, ethylmorpholine, piperidine, alkylpiperidines, piperazine, alkylpiperazines; ethyleneamines including DETA, TETA, TEPA, and the like; alkylamines including methylamine, dimethylamine, alkylmethylamines, dimethylalkylamines; methylaminopropylamine; dimethylaminopropylamine; dimethylaminoethylamine; methylaminoethylamine, oleic acid and combinations thereof.

In a preferred embodiment, the corrosion inhibitor is selected from N, N-dimethylethanolamines and oleic acid.

In still another embodiment, the biocide used in the microbecidal composition includes but not limited to aldehydes, acrolein, quaternary ammonium compounds, amines, diamines, isothiazolones, methyl chloromethyl-isothiazolone and 4,5-dichloro-2-n-octyl-4-isothiazolin-3-one, Tetrakis(hydroxymethyl) phosphonium sulfate, Didecyldimethylammonium chloride, Didecyldimethylammonium carbonate and a combination thereof.

In a preferred embodiment, the biocide is selected from benzoic acid, propan-2-ol, glutaraldehyde, tetrakis (hydroxymethyl) phosphonium sulfate, benzalkonium chloride (BAC), plant derived natural biocide as disclosed in Indian patent application no. 482/MUM/2008.

In another aspect of the present invention, there is provided a method to reduce, mitigate, or eliminate MIC in internal surface of the oil transporting pipelines. The method comprises of: initially the muck sample from the subject pipelines is collected using standard microbiological methods. The count of the SRB, APB, IRB and HAB is done using various media known in the prior art or the same. The microbes isolated from pipeline are studied for their ability to cause corrosion using weight loss on exposed metallic coupons that in prior art. The minimum inhibiting concentration and killing dose and time for the microbecidal composition is decided as per standard methods known in prior art.

The subject pipelines are first cleaned using repetitive chain of pigging with the help of cleaning brush pig. Once the pipeline is cleaned, the microbecidal dosing is initiated. Before starting a microbecidal dosing, a plug is created using Bi-di pig and first batch of microbecide is dosed through the launching barrel of the pipeline. Subsequently, the batches of microbecide are dosed in similar way and the biocide plug is closed by launching another pig after the last dose of biocide. Once microbecide dosing is completed, a chain of pig is run for at least two times to remove debris, if any. The treatment results in reduced or no microbial count in the muck sample subsequent to the cleaning pig run.

Thus, in an embodiment of the present invention, there is provided a method for mitigating/reducing microbiologically induced corrosion in transport pipelines (MIC), the method comprising of:

i. venting and draining of launching barrel to remove traces of vapors, oil and reducing the pressure inside the barrel to zero;
ii. introducing first Bi-Di pig along with transmitter in the barrel of step (i); and injecting first dose of microbecidal composition as claimed in claim 1;
iii. injecting crude oil through kicker line in the barrel of step (ii) to push pig into the main pipeline and opening of barrel valve and kicker line valve;
iv. closing of main line valve and injecting second dose of microbecide into the barrel and further opening of barrel valve, kicker line valve and keeping main line valve in close condition;
v. running booster pumps and injecting crude oil to push the composition into mainline for a duration of 10 minutes;
vi. repeating steps (iii-v) and inserting second Bi-Di pig along with transmitter after venting and draining of launching barrel to obtain reduced microbial count in the pipeline; and
vii. tracking with pig alert/tracker followed by opening of main line valve and closing of kicker line valve and barrel valve.

In an embodiment of the present invention, there is provided a method for mitigating/reducing the microbiologically induced corrosion in transport pipelines, wherein the pipeline is first treated with pigging. The pigging helps to physically remove the biofilm and acts to disturb the biofilm such that the permeation of the biofilm is improved, thereby rendering the microbecidal treatment more effective.

In an embodiment of the present invention, the bacterial biofilm is formed by anaerobic and anaerobic bacteria.

In another embodiment of the present invention, the length of microbecide plug depends upon the microbial count per gram of muck sample.

In yet another embodiment of the present invention, the length of microbecide plug also depends upon the length of the pipeline segment under treatment.

In still another embodiment of the present invention, the length of microbecide plug also depends upon the total treatment time based on the killing experiment.

Accordingly, one time treatment described herein in the present invention is sufficient for 3-5 years of MIC control in pipeline and indicates presence of MIC at present far below than the threshold level.

In yet another embodiment of the present invention, the susceptible metal surface that is treated is a metal surface of equipment for transporting of crude or distillates.

Thus, the present invention relates to an effective and cost-effective solution to mitigate the problem of microbiologically influenced corrosion (MIC) in pipelines. The microbecidal composition was evaluated for its ability to mitigate or prevent the corrosion and on calculation of corrosion rate, it was observed that after the dosing of the microbecidal composition, the corrosion rate was reduced to 0.3 (as depicted in Table 3 of Example 5). The results of the study indicates that microbecidal composition was able to reduce the microbiologically induced corrosion (MIC). Further, it was also observed that a low concentration of biocide dosing is sufficient for MIC control. Moreover, during the process of MIC control the mixture of crude and biocide (alcohols and plant biocides) does not affect the quality of crude and the same can be used for regular refining. In addition, the composition and method provided in the present invention is effective and environment friendly.

Having described the basic aspects of the present invention, the following non-limiting examples illustrate specific embodiment thereof.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods, the exemplary methods, devices and materials are described herein. It is to be understood that this disclosure is not limited to particular methods, and experimental conditions described, as such methods and conditions may vary.

Example 1: Synthesis of Amine Functionalized Lignin-Based Nanoparticle

To synthesize the amine functionalized lignin-based nanoparticle, a solution of 5 wt. % of lignin was added to ethylene glycol and the solution was stirred at a temperature of 45° C. for a duration of 2 hours. The lignin used in the preparation was commercially obtained from Sigma-Aldrich. Further, 0.2M hydrochloric acid and 0.2M nitric acid was added at a rate of 5 drop/minute until the pH value of the solution reached at 2. This was followed by the addition of drop wise 0.02 M Sodium bis-(2-ethylhexyl)-sulfosuccinate as stabilizer. The obtained solution was kept for a duration of 2 hours and then, filtered to remove the insoluble impurities. The lignin-based nanoparticle was obtained by dializing the solution against deionized water for a duration of 24 hours to reach at a final pH of 7. Subsequently, 0.02 mM triethylene tetramine was added to the lignin nano particle and the solution was stirred at a temperature of 50° C. for a duration of 30 minutes. 0.02 mM formaldehyde solution was added at a rate of 0.1 g/min to obtain the amine functionalized lignin nanoparticle.

Example 2: Preparation of Microbecidal Composition

To prepare the microbecidal composition, the lignin of paddy straw-based nanoparticle (100 mg) was added in alcohol (4867.5) per liter. This was followed by the addition of 5 mg of linoleate-based surfactant. The obtained mixture was stirred at a temperature of 40° C. for a duration of 35 minutes and was followed by the addition of 25 mg glutaraldehyde and 2.5 mg triethanolamine based corrosion inhibitor and further, the mixture was stirred at room temperature and ambient pressure for a duration of 20 minutes to obtain the microbecidal composition.

Example 3: Evaluating Synergistic Effect of Components of Microbecidal Composition Against Microbial Induced Corrosion (MIC)

To test the MIC activity, the microbecidal composition was subjected to antimicrobial screening against MIC causing microbes and their mediated corrosion. 10 gram of muck sample from a pipeline having MIC was used as inoculum. The growth of the microbes was followed by visual observation as well as by counting the CFU/ml on respective media. The growth was compared with control i.e., without microbecidal composition. Further, individual components of the microbecidal composition were evaluated to evaluate the synergistic effect of the composition (Table 1). As observed from the Table-1 below, when the individual components of the microbecidal composition was used, no significant MIC reduction was observed. However, when whole composition was added, complete reduction was observed i.e., 98.3% of MIC reduction was observed. This indicates that all the components in the microbecidal composition work synergistically to effectively reduce MIC.

TABLE 1

Synergistic effect of components of microbecidal composition

| Components of Microbecidal Composition | Base Corrosion Rate (mpy) (without Microbecidal composition) | After dosing of Microbecidal composition (mpy) | Percentage (%) reduction in MIC |
|---|---|---|---|
| Alcohol (10000 ppm) | 12 | 10.75 | 10% |
| Biocide (25 ppm) | 12 | 9.6 | 20% |

TABLE 1-continued

Synergistic effect of components of microbecidal composition

| Components of Microbecidal Composition | Base Corrosion Rate (mpy) (without Microbecidal composition) | After dosing of Microbecidal composition (mpy) | Percentage (%) reduction in MIC |
|---|---|---|---|
| Corrosion Inhibitor (2.5 ppm) | 12 | — | No effect on MIC |
| Lignin-based nanoparticle (100 ppm) | 12 | 5.2 | 56.66% |
| Surfactant (5 ppm) | 12 | — | |
| Microbecidal composition- of present invention (5000 ppm) (25 mg glutaraldehyde, 2.5 mg triethanolamine based corrosion inhibitor, 100 mg lignin of paddy straw-based nanoparticle, 5 mg linoleate based surfactant, 4867.5 ethanol) per liter | 12 | 0.5 | 95.83 |
| Microbecidal composition of present invention (5000 ppm) (25 mg glutaraldehyde, 2.5 mg triethanolamine based corrosion inhibitor, 100 mg lignin of paddy straw-based nanoparticle, 5 mg linoleate based surfactant, 4867.5 ethanol) per liter | 12 | 0.14 | 98.3% |
| Microbecidal composition of present invention (5,000 ppm) (50 mg tetrakis (hydroxymethyl) phosphonium sulfate, 5 mg N, N-dimethylethanolamines based corrosion inhibitor, 200 mg paddy lignin-based nanoparticle, 10 mg polyoxyethylene alkyl ether based surfactant, 9735 mg ethanol per liter | 12 | 0.3 | 97.5 |
| Microbecidal composition of present invention (10,000 ppm) (50 mg tetrakis(hydroxymethyl) phosphonium sulfate, 5 mg N, N-dimethylethanolamines based corrosion inhibitor, 200 mg paddy lignin-based nanoparticle, 10 mg polyoxyethylene alkyl ether based surfactant, 9735 mg ethanol per liter | 12 | 0.15 | 98.7 |

Example 4: Evaluating Microbecidal Composition Against Microbial Induced Corrosion (MIC): MIC Mitigation Study The microbecidal composition prepared in the present invention, was evaluated for its ability to mitigate or prevent the corrosion. The study was performed in presence of microbiologically influenced corrosion (MIC) causing bacteria inoculum and was evaluated in both aggravated static and dynamic laboratory conditions. Initially, the mild carbon steel coupon was polished and washed with water and acetone. The diameter and thickness of each coupon was determined. The static test was conducted in beakers while the dynamic test was conducted by dynamic 'Wheel test'. Accordingly, the microbecidal composition @5000 ppm (25 mg glutaraldehyde, 2.5 mg triethanolamine based corrosion inhibitor, 100 mg lignin of paddy straw-based nanoparticle, 5 mg linoleate based surfactant, 4867.5 ethanol) per liter) was initially evaluated for its ability to protect from corrosion in static test and subsequently, the potential extract was further evaluated in dynamic test. The static test was conducted for around 60 days while dynamic test was conducted for a duration of 30 days. The experiments were terminated after removing the coupons and were washed by neutralized acid to remove the corrosion products, and subsequently rinsed with sterile distilled water, and then dried. Final weight of the coupons in each system was recorded and corrosion rate of the metal coupons were calculated with the following formula:

$$\text{Corrosion rate} = (K \times W)/(A \times T \times D)$$

wherein, K=3450000 (constant used to determine corrosion rate in miles per year (mpy)); T=Time of exposure (h); W=Weight loss (g); D=Density (g/cm$^3$); A=Surface area (cm$^3$). Table 2 indicates corrosion rate in wheel test after duration of 60 days.

In the study, microbecidal composition (5000 ppm) was used; inoculum: microbial causing consortia, $8.0 \times 10^8$ cfu/ml; speed: 12-16 rpm; Temperature: 38-40° C.; A*: 125 ml of diesel with 2% water containing 70-ppm chloride in form of HCl.

Corrosion rate data indicates that microbecidal composition was able to inhibit the microbiologically induced corrosion (MIC).

TABLE 2

Corrosion rate (mpy) in Wheel test after 60 days

| S.No. | Test condition | Corrosion rate (mpy) |
|---|---|---|
| 1. | A* | 6.4 |
| 2. | A* + Inoculum | 8.2 |
| 3. | A* + Inoculum + Microbecidal composition | 0.4 |

TABLE 3

Corrosion Rate before and after dosing of Microbecidal composition

| | Before Microbecidal composition dosing | After Microbecidal composition |
|---|---|---|
| Corrosion rate (MPY) | 6.7 | 0.3 |

Example 5: Method for Reducing the Microbiologically Induced Corrosion in Transport Pipelines by Using the Microbecidal Composition The microbecidal composition (25 mg glutaraldehyde, 2.5 mg triethanolamine based corrosion inhibitor, 100 mg lignin of paddy straw-based nanoparticle, 5 mg linoleate based surfactant, 4867.5 ethanol) per liter) was dosed in a 150 Km long crude oil transporting pipeline at the dose of 5000 ppm as following: Initially, venting and draining was performed in the launching barrel to remove the traces of vapors, oil and to reduce the pressure inside the barrel to zero. The first Bi Di pig along with transmitter was introduced in the barrel and subsequently, the first dose of the composition was injected. Further, crude oil was injected through kicker line to push the pig into the main pipeline and the barrel valve (BV) and kicker line valve (KLV) was opened. Then it was followed by the closure of main line valve (MLV) and second dose of composition was injected into the barrel and barrel valve, kicker line valve was opened, and the main line valve was kept in close condition. Venting and Draining of launching barrel was done such that any traces of vapors and oil get removed and the pressure inside the barrel becomes zero. After proper closing of barrel door, booster pumps were run, and crude oil was injected to push the composition into mainline for a duration of 10 minutes. The steps were repeated and subsequently, second Bi-Di pig along with transmitter was introduced after venting and draining of launching barrel. Further, once pig started moving, the tracking was performed with Pig alert/tracker followed by opening of main line valve and closing of kicker line valve and barrel valve. Table 3 shows corrosion rate before and after dosing of microbecidal composition. Table 4 indicates the microbial count before and after the treatment of one pipeline segment by microbecidal composition. It was observed that after the treatment of pipeline segments with the microbecidal composition, there was no growth of microbes. Thus, the results indicates that the microbecidal composition was effective in reducing the growth of microbes and hence, mitigating the microbial induced corrosion (MIC).

TABLE 4

The Microbial Count before and after treatment of the one pipeline segment

Microbial count (CFU/g) in muck sample

| S.No. | Type of bacteria | Before microbecidal dosing ||||||| After microbecidal dosing |||||
|---|---|---|---|---|---|---|---|---|---|---|---|---|---|
| | | 1st Pigging | 2nd Pigging | 3rd Pigging | 4th Pigging | 5th Pigging | 6th Pigging | 7th Pigging | 1st Pigging | 2nd Pigging | 3rd Pigging | 4th Pigging | 5th Pigging |
| 1. | SRB | $7.3 \times 10^7$ | $8.2 \times 10^5$ | $8.6 \times 10^7$ | $5.9 \times 10^6$ | $4.3 \times 10^7$ | $5.7 \times 10^5$ | $8.3 \times 10^7$ | Nil | Nil | NIL | NIL | NIL |
| 2. | IRB | $8.5 \times 10^8$ | $9.5 \times 10^7$ | $4.6 \times 10^5$ | $2.9 \times 10^7$ | $4.5 \times 10^6$ | $5.6 \times 10^6$ | $6.9 \times 10^6$ | Nil | Nil | Nil | Nil | Nil |
| 3. | HAB | $1.5 \times 10^{11}$ | $8.2 \times 10^{12}$ | $7.5 \times 10^{12}$ | $7.4 \times 10^{11}$ | $1.8 \times 10^{12}$ | $5.8 \times 10^{11}$ | $3.5 \times 10^{11}$ | $2.9 \times 10^3$ | Nil | Nil | Nil | Nil |
| 4. | SLIM | $7.9 \times 10^7$ | $8.0 \times 10^6$ | $5.5 \times 10^7$ | $3.6 \times 10^7$ | $2.4 \times 10^6$ | $3.7 \times 10^5$ | $7.7 \times 10^5$ | $8.5 \times 10^2$ | Nil | Nil | Nil | Nil |
| 5. | APB | $7.5 \times 10^4$ | $1.8 \times 10^6$ | $6.7 \times 10^5$ | $8.0 \times 10^6$ | $4.7 \times 10^6$ | $5.5 \times 10^5$ | $3.4 \times 10^5$ | Nil | Nil | $1.5 \times 10^2$ | Nil | Nil |
| 6. | LNB | $5.0 \times 10^3$ | $6.4 \times 10^3$ | $1.3 \times 10^3$ | $2.5 \times 10^3$ | $2.7 \times 10^2$ | $7.1 \times 10^2$ | $8.5 \times 10^2$ | Nil | Nil | NIL | NIL | NIL |

The invention claimed is:

1. A microbicidal composition consisting of:
   (i) a lignin-based nanoparticle in an amount ranging from 2000-20,000 ppm;
   (ii) a biocide in an amount ranging from 500-5000 ppm;
   (iii) a surfactant in an amount ranging from 100-1000 ppm;
   (iv) a corrosion inhibitor in an amount ranging from 50-500 ppm; and
   (v) at least one alcohol, wherein the lignin-based nanoparticle, the biocide, the surfactant, and the corrosion inhibitor are dispersed in the at least one alcohol, and wherein the microbicidal composition mitigates internal microbiological influenced corrosion caused by a bacterial biofilm deposited on a metal surface in petroleum transporting pipelines.

2. The microbicidal composition as claimed in claim 1, wherein the lignin-based nanoparticle is functionalized with amine functionalizing agent.

3. The microbicidal composition as claimed in claim 2, wherein the lignin-based nanoparticle has a size in a range of 20-50 nm.

4. The microbicidal composition as claimed in claim 1, wherein the biocide is selected from the group consisting of aldehydes, acrolein, quaternary ammonium compounds, amines, diamines, isothiazolones, methyl chloromethyl-isothiazolone, 4,5-dichloro-2-n-octyl-4-isothiazolin-3-one, Tetrakis(hydroxymethyl) phosphonium sulfate, Didecyldimethylammonium chloride, Didecyldimethylammonium carbonate and a combination thereof.

5. The microbicidal composition as claimed in claim 1, wherein the alcohol is selected from the group consisting of ethanol and isopropanol, a glycol, ethylene glycol, diethylene glycol, 1,2-propylene glycol, dipropylene glycol, tripropylene glycol, a glycol ether, butyl glycol and butyl diglycol, a glycol ester, butyl diglycol acetate, 2, 2, 4-trimethylpentanediol monoisobutyrate, polyethylene glycol, polypropylene glycol, benzyl alcohol, n-butyl alcohol, benzyl alcohol, 2, 4-dichlorobenzyl alcohol, 2-phenoxyethanol and a combination thereof.

6. The microbicidal composition as claimed in claim 1, wherein the components (i)-(iv) of composition are dispersed in alcohol.

7. The microbicidal composition as claimed in claim 1, wherein the surfactant is selected from the group consisting of long chain alkylamine or N-based alkylamines and derivatives, N-[2-[(2-Aminoethyl) amino] ethyl]-9-octadecenamide, n-Benzalkonium chloride (BAC), $C_nH_{(2n+1)}$-COO(CH$_2$CH$_2$O)12CH$_3$, polyoxyethylene alkyl ether, n-alkyl trimethyl ammonium surfactant, potassium alkanoate, Dodecylpyridinium bromide, octylglucoside, sodium dodecyl sulfate, trans-Cinnamaldehyde, sodium bis-(2-ethylhexyl)-sulfosuccinate, cetylpyridinium chloride, primary alcohol ethoxylate, polyoxyethylene nonyl phenyl ether, polyethylene glycol esters, linoleate, dodecyl amine and a combination thereof.

8. The microbicidal composition as claimed in claim 1, wherein the corrosion inhibitor is selected from the group consisting of N,N-dimethylethanolamines, (N,N-dimethylaminoethoxy) ethanol; dimethylethanolamine; triethanolamine; methyldiethanolamine; ethanolamine; diethanolamine; other cyclic amines including morpholine, methylmorpholine, ethylmorpholine, piperidine, alkylpiperidines, piperazine, alkylpiperazines; ethyleneamines including DETA, TETA, TEPA, and the like; alkylamines including methylamine, dimethylamine, alkylmethylamines, dimethylalkylamines; methylaminopropylamine; dimethylaminopropylamine; dimethylaminoethylamine; methylaminoethylamine, oleic acid and a combination thereof.

* * * * *